United States Patent [19]

Nossek

[11] Patent Number: 4,617,537
[45] Date of Patent: Oct. 14, 1986

[54] METHOD FOR DIGITAL QUADRATURE AMPLITUDE MODULATION

[75] Inventor: Josef A. Nossek, Iffeldorf, Fed. Rep. of Germany

[73] Assignee: Siemens Aktiengesellschaft, Berlin and Munich, Fed. Rep. of Germany

[21] Appl. No.: 595,527

[22] Filed: Mar. 30, 1984

[30] Foreign Application Priority Data

Apr. 22, 1983 [DE] Fed. Rep. of Germany ....... 3314603

[51] Int. Cl.[4] .......................... H03C 1/00; H03D 1/00
[52] U.S. Cl. ..................................... 332/48; 332/9 R; 332/31 R
[58] Field of Search ................. 332/9 R, 31 R, 41, 42, 332/48; 375/41, 43; 455/108, 109

[56] References Cited

U.S. PATENT DOCUMENTS

| | | | |
|---|---|---|---|
| 4,003,002 | 1/1977 | Snijders et al. | 332/10 |
| 4,086,536 | 4/1978 | Acker | 455/109 |
| 4,433,310 | 2/1984 | Bic et al. | 332/41 X |

OTHER PUBLICATIONS

Ringelhaan et al., "Linear Modulation of Digital Signals with an Applied Example for Analog Equipment", NTG-Fachberichte, vol. 70, 1980, pp. 81–88.

Gockler, "Principles and Possible Applications of Digital Filters In Telecommunications Technology", in Frequenz 35(1981) 3/4, Section 3, pp. 71–73.

Primary Examiner—Eugene R. LaRoche
Assistant Examiner—Robert J. Pascal
Attorney, Agent, or Firm—Hill, Van Santen, Steadman & Simpson

[57] ABSTRACT

Spectrum-converting digital filters are employed for quadrature amplitude modulation. Given the method of the invention, the frequency of the two carrier oscillations residing at 90° relative to one another amounts to one-fourth the sampling frequency and, in addition, their phase positions relative to the sampling times is selected such that every second sample of both carrier oscillations is alternately zero.

1 Claim, 6 Drawing Figures

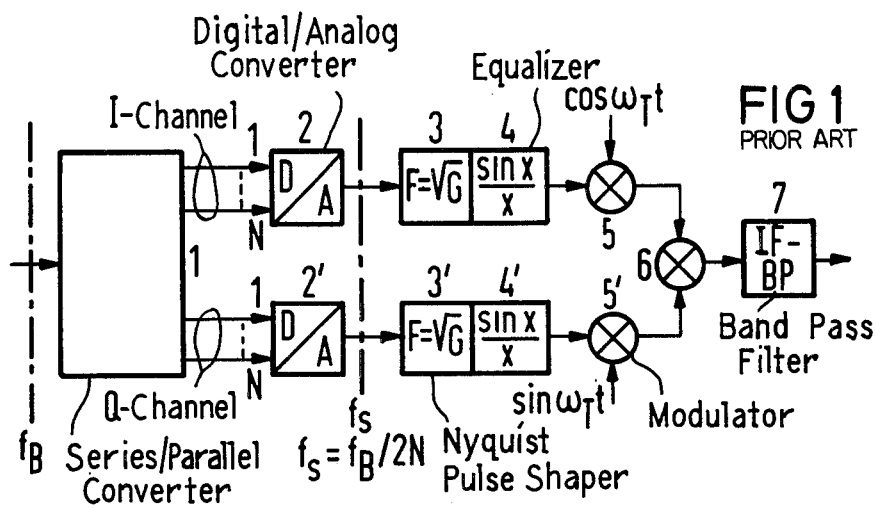
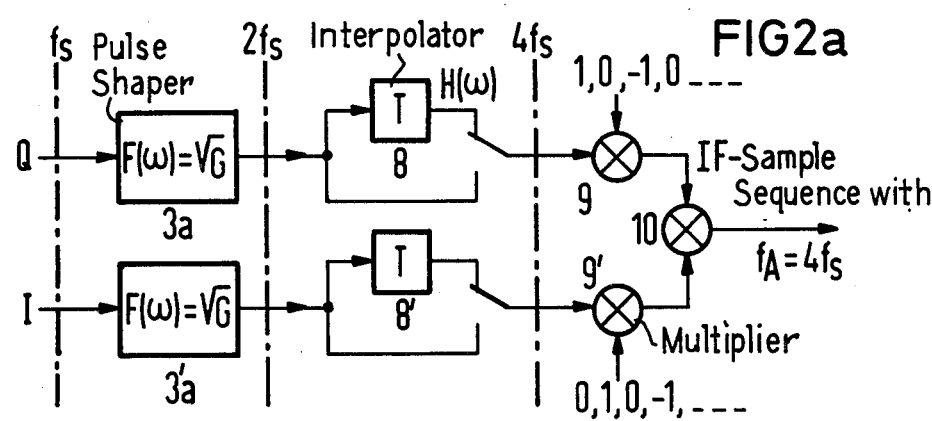
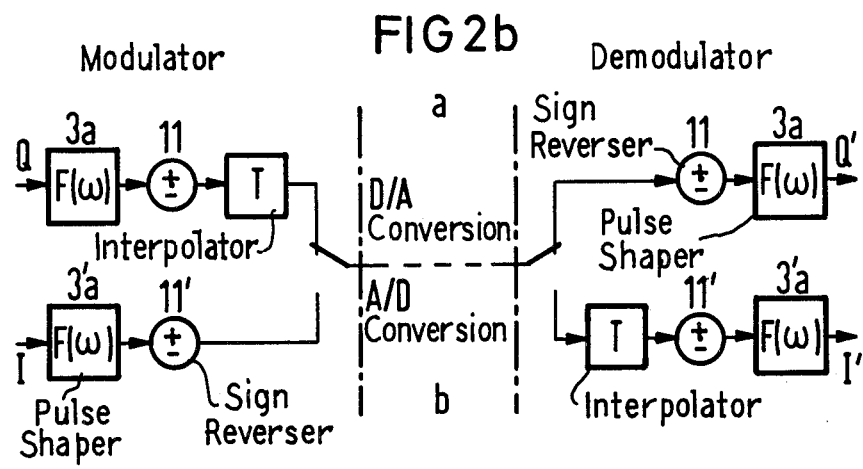

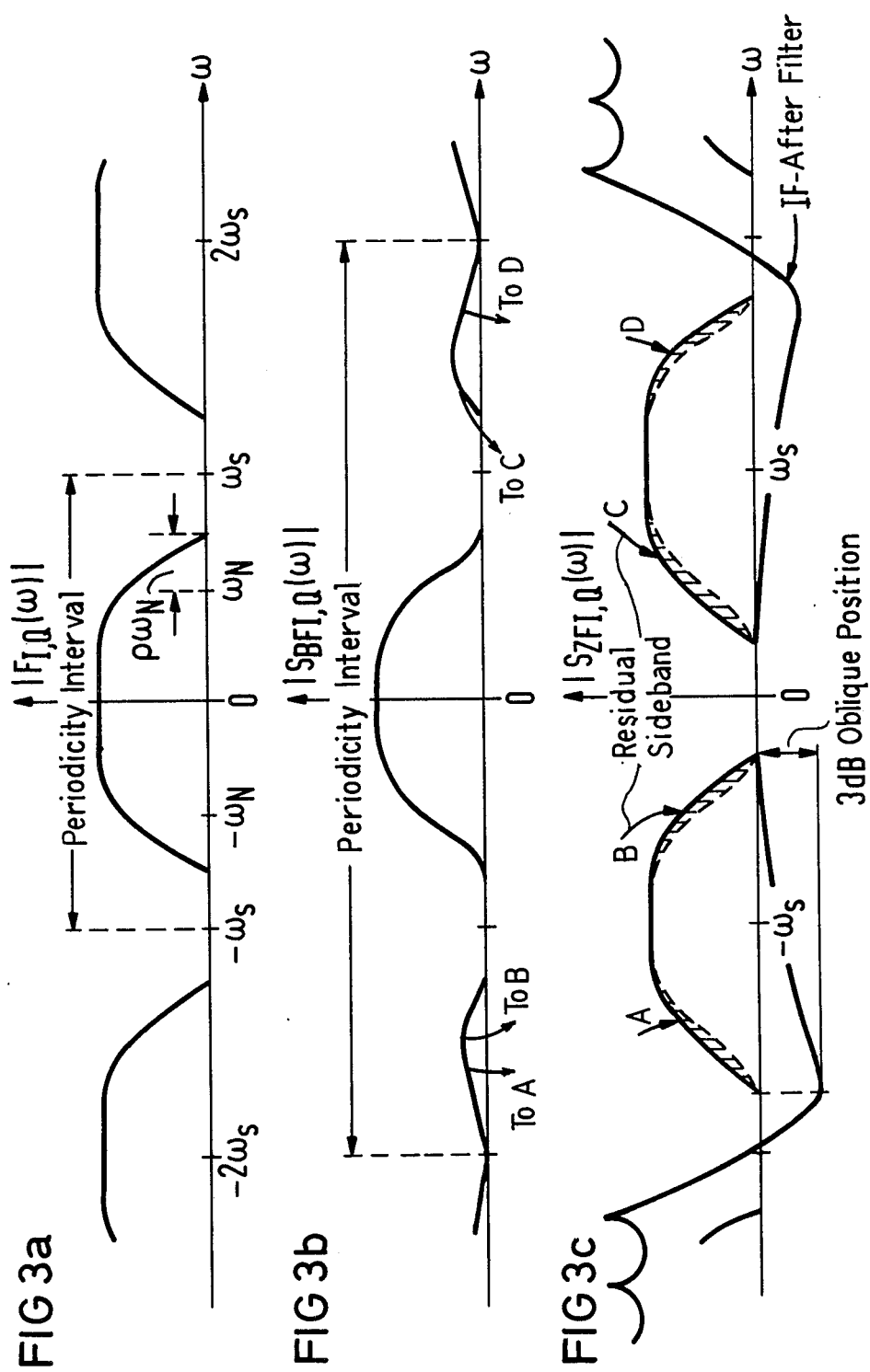

METHOD FOR DIGITAL QUADRATURE AMPLITUDE MODULATION

BACKGROUND OF THE INVENTION

1. Field of the Invention

The present invention relates to a method of digital quadrature amplitude modulation using spectrum-shaping digital filters wherein sampling sequences consisting of two carrier oscillations residing at 90° relative to one another are available.

2. Description of the Prior Art

In terms of basic concept, methods for quadrature amplitude modulation (QAM) have been disclosed in the publication NTG Fachberichte (1980), pp. 81–85. Digital, spectrum-covering low-pass filters are also employed in this reference. The digital/analog conversion subsequently occurs and the quadrature amplitude modulation occurs on an analog basis. This also applies, analogously, to the receiving path.

It should be further taken into consideration that circuits that meet the so-called Nyquist condition are required for the resolution of a number of telecommunications transmission problems. This condition is defined per se in that appertaining circuits are required when, for example, it is a matter of transmitting pulses, without intersymbol noise (i.e. pulses without crosstalk) or, respectively, of converting video frequency bands, whereby the frequency zero and a vestigial sideband must also be transmitted. Possibilities for the synthesis of Nyquist filters are specified for processing analog signals, for example, in the periodical "Frequenz", 1973, Vol. 27, pp. 2–6. In terms of basic concept, these circuits amount to the fact that realizing so-called strict diplexers wherein filters having a so-called self-reciprocal characteristic function are employed. In the meantime, so-called digital technology is also employed in telecommunications transmission systems and, therefore, the problem also arises of creating selection devices therefore, i.e. circuits and networks for which the term digital filters has become standard. Possibilities for the realization of such digital filters, for example, are set forth in rather general terms in the book by Temes and Mitra, entitled "Modern Filter Theory and Design", John Wiley & Sons, 1973, particularly on Pages 505–557. So-called wave digital filters comprise a special species of these filters. Such circuits are disclosed, for example, in the German Letters Pat. No. 2,027,303 or, respectively, in the periodical "AEÜ", Vol. 25 (1971), pp. 79–89. Wave digital filters have the advantage that analog reference filters can be directly digitally simulated.

As already mentioned above, the quadrature amplitude modulation in the initially-mentioned article (NTG Fachberichte, pp. 81–88) is carried out on an analog basis.

SUMMARY OF THE INVENTION

The object of the present invention is to provide specific possibilities with which all further method steps can be digitally executed upon the use of spectrum-converting digital filters.

Given methods of the type mentioned above, this object is achieved, according to the present invention, in such a system which is characterized in that the frequency of two carrier oscillations which are at 90° relative to one another is one-fourth of the sampling frequency and their phase positions relative to the sampling times is selected such that every second sample of both carrier oscillations is alternately zero in such a manner that respectively one of the two carrier oscillations is zero at every clock time.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a schematic representation of a known system which is provided for a better understanding of the present invention;

FIG. 2a is a schematic representation of a QAM modulator, having a pulse shaper, for carrying out the present invention;

FIG. 2b is a schematic representation of a QAM modulator and demodulator in which an interpolator or, respectively, a decimator are combined;

FIG. 3 is a graphic illustration of wave forms with respect to frequency $\omega$, wherein further;

FIG. 3a illustrates the baseband spectrum following the pulse shaper;

FIG. 3b illustrates the baseband spectrum following an interpolation filter; and FIG. 3c illustrates the intermediate frequency spectrum (IF spectrum) following a multiplier and the fundamental attenuation curve of an IF after-filter for the correction of the sinx/x distortion of the digital/analog converter and for the suppression of the periodic continuation of the spectrum.

DESCRIPTION OF THE PREFERRED EMBODIMENTS

Referring to FIG. 1, a bit frequency $f_B$ is input into a serial/parallel converter 1. A pair of channels I and Q are generated in which respective stages 1–N are indicated. The digital/analog converters 2 and 2', respectively, follow in the channel I and in the channel Q and the so-called symbol frequency $f_S$ can be subsequently seen, whereby the relationship $f_S = f_B/2N$ holds true and $2_N$-level signals are present in the channel I and in the channel Q. Identical circuits for the Nyquist pulse shaping follow, these being provided with reference characters 3 and 3', respectively, and having the transfer function $F = \sqrt{G}$. The sinx/x equalizers 4 and 4' follow so that hold distortions of the digital/analog converter can be intercepted. The Nyquist pulse shaping occurs at 50% of the pulse in the modulator and these modulators are referenced 5 in the channel I and 5' in the channel Q and the 90° phase shift of these two channels is achieved by way of multiplication factors cos $\omega_T T$ or, respectively, by way of multiplication factors cos $\omega_T \cdot T$ or, respectively, sin $\omega_T \cdot T$. The quadrature modulators 5 and 5' are therefore multipliers and the channels I and Q are recombined in an adder 6 and supplied to a following intermediate frequency bandpass filter 7. This IF bandpass filter then filters out undesired modulation products. Given a resolution of N bits, the digital/analog converters 2 and 2', respectively, must have a considerably-higher accuracy, in particular $M = N + (4...6)$ bits, whereby M signifies the accuracy. The conversion rate is thereby equal to the sample frequency $f_S$.

Given the traditional quadrature modulator having pulse shaping according to FIG. 1, the serial bit stream is first converted into two multi-level symbol streams in a serial/parallel converter 1 and is subsequently digital-/analog converted (2,2'). Given a 16 QAM method, the resolution of these digital/analog converters amounts, for example, to 2 bits in each quadrature channel. The accuracy of these converters, however, must be considerably higher than the resolution (estimated at about 4 ... 6 bits, i.e. higher by the factor 16 ... 64). The following generally applies.

A $2^{2N}$ QAM method is based on $2^N$-level signals in the quadrature channels I,2 and on an N-bit resolution and an $M=(N+(4 \ldots 6))$ bit accuracy of the digital/analog converter. The pulse shaping at the transmitting side subsequently occurs, this together with the pulse shaping to be identically provided at the receiving side (demodulator), meeting the Nyquist condition type 1 and the intersymbol noise thus disappearing. This identical division to modulator and demodulator is optimum in view of the adjacent-channel influence. Furthermore, a sin x/x equalization 4, 4' is co-incorporated into the pulse shaper at the transmitting side in order to equalize the hold distortions of the digital/analog converters.

The following requirement is made of the carrier frequency $\omega$ at the following modulation (multiplication 5,5'):

$$\omega_T = 2\pi f_T \geq (1+\zeta) 2\pi f_N, \quad f_s = 2f_N \qquad (1)$$

where $\zeta$ is the known roll-off factor and $f_n$ is the Nyquist frequency of the pulse shaper.

In the transition to a digital concept, it is necessary for reasons of realizability that the intermediate frequency (IF) carrier be selected as low as possible upon consideration of equation (1).

The IF selection (bandpass filter 7) occurs after the combination of the two quadrature channels I and Q in order to suppress undesired, higher modulation products and interference lines.

The demodulator proceeds directly from the modulator by way of reversing the direction of signal flow. The sin x/x equalizer in the pulse shaper is then omitted. Added thereto is the carrier reacquisition and the clock reacquisition that are of importance in the coherent demodulation and in the regeneration of the characters. No fixed relationship between carrier and clock is usually provided given the conventional principle of construction.

Here, also, there is a significant difference in the transition of the digital design. The sampling frequency at the input of the modulator (multiplier) must be a whole multiple of both the character frequency $f_S$ and of the carrier frequency $f_T$.

$$f_A = K_1 \cdot f_S = K_2 \cdot f_T K_1, \quad K_2 \in N. \qquad (2)$$

Only the case of bandband pulse shaping has been considered, since it leads to the lowest operating speed given a digital solution.

FIGS. 2a and 2b include circuit elements that have already been explained with reference to FIG. 1. The channels Q and I may again be seen, along with a so-called interpolating pulse shaper 3a or 3'a, which is followed in FIG. 2a by an interpolator having the transfer function $H(\omega)$. These interpolators are indicated with the reference characters 8 and 8' and are illustrated as delay elements T followed by switches. A multiplier 9 is connected to the interpolator 8 in the channel Q and a multiplier 9' is connected by way of a respective switch to the interpolator 8' in the channel I. The interpolator 9 multiplies the signal sequence by the numerical sequence 1, 0, −1, 0, ... when the multiplier 9' in the channel I multiplies the signal sequence by the numerical sequence 0, 1, 0, −1.

The symbol frequency $f_S$ or, respectively, $2f_S$ or, respectively, $4f_S$ is also identified in FIG. 2a with broken lines, i.e. at those locations at which the interpolation takes effect.

Interpolator and decimator are combined in FIG. 2b and the arrangement is indicated for the modulator and demodulator sides. As likewise symbolically illustrated, the reference characters 11 and 11', respectively, indicate digital circuits that carry a reversal of operational sign. A likewise indicated by broken lines, the digital/analog and, respectively, analog/digital conversions and other conversions can be undertaken between the modulator and the demodulator.

The baseband spectrum after the pulse shaper is shown in FIG. 3a as a function of the frequency $\omega$, as is the bandband spectrum after the interpolation filter in FIG. 3b.

The periodicity intervals are likewise indicated and further designations shall be explained below. The IF spectrum after the multiplier is illustrated in FIG. 3c, as is a basic attenuation curve of an IF subsequent filter for the correction of the sin x/x distortion of the digital/analog converter and for the suppression of the periodic continuation of the spectrum.

It is advantageous when the spectrum-shaping filters preceding the modulators 9, 9' are interpolating or, respectively, decimating bridge wave digital filters fulfilling the Nyquist condition that simultaneously execute the reversal of the operational sign of every second sample. Such bridge wave digital filters are disclosed in a copending application Ser. No. 595,400, filed Mar. 30, 1984.

For the purpose of a further, general explanation of FIGS. 2a and 2b or, respectively, FIG. 3, the following should also be noted in comparison to FIG. 1.

Basic significance is accorded to the selection of the constants $K_1$ and $K_2$ according to equation (2) upon consideration of equation (1). In addition, it is advantageous when the samples of the sinusoidal carry oscillation only assume the values +1, 0 and −1. This is the case when the constant $K_2$ assumes the values $$K_2 = 2, 3, 4 \text{ or } 6.$$

Of these four possibilities, $K_2 = 4$ is an excellent value, since the corresponding sampling sequences for the two carrier oscillations $$\cos \omega_T n T: 1,0,-1,0,1,0,-1, \ldots$$

$$\sin \omega_T n T: 0,1,0,-1,0,1,0, \ldots$$

with $T = 1/f_A$, $f_A = 4f_T$ and exhibits only a sampling value differing from zero (+ or −) at every sampling time and the combination of the two quadrature channels I and Q therefore becomes particularly simple. This means that the quadrature modulation is accomplished by way of simple, alternating blanking of every second sample and through-connection or, respectively, inversion of the remaining values in the quadrature channels, and the combination is accomplished by way of interleaving the two sampling sequences.

In order to observe equation (1) for all $\zeta \in [0,1]$ it suffices to select $f_S = f_T = 1/4 \, f_A$ i.e. $K_1 = K_2 = 4$ and equation (2) is likewise fulfilled.

For example, sampling sequences having $f_A = 4f_S$ must be supplied to the modulators (multipliers). This means that the pulse-shaping filters must interpolate, i.e. must increase the sampling rate by the factor 4. This interpolation should advantageously be executed in two stages by, respectively, the factor 2. In the following, the spectrum or, respectively, pulse shaping is thereby completely shifted into the first part of the sampling rate increase (or, respectively, reduction, i.e. decimation in the demodulator).

The second part of the sampling rate change therefore relates to a sequence whose spectrum has already experienced a 50% Nyquist shaping and should accomplish the sampling rate 4 $f_S$ required for the modulation with the least expense possible. As shown below, this can be executed in a particularly efficient fashion with a type of vestigial sideband modulation for both quadrature channels.

According to FIG. 2a, an interpolation filter 8, 8' having the transfer function $$H(\omega) = 1 + e^{-j\omega T} = 2e^{-j\omega \frac{T}{2}} \cos\omega \frac{T}{2} \quad (3)$$

is employed. Then, deriving for the baseband spectrum at the multiplier input in the channel I, as a consequence of a symbol is $$S_{BFI}(\omega) = 2e^{-j\omega \frac{T}{2}} \cos \frac{\omega T}{2} \cdot F_I(\omega) \quad (4)$$

The corresponding case applies to the channel Q. Deriving for the IF spectra before the combination is $$S_{ZFI}(\omega) = \frac{1}{2} (S_{BFI}(\omega - \omega_s) + S_{BFI}(\omega + \omega_s)) \quad (5)$$

$$S_{ZFQ}(\omega) = \frac{1}{2j} (S_{BFQ}(\omega - \omega_s) - S_{BFQ}(\omega + \omega_s)).$$

Using the periodicity of $F_{I,Q}(\omega)$, equation (4) is inserted in equation (5) and produces $$F_{I,Q}(\omega) = F_{I,Q}(\omega + 2n\omega_s), \, n\in Z. \quad (6)$$

For the IF spectra $$S_{ZFI} = F_I(\omega - \omega_s) \quad (7)$$

$$S_{ZFQ} = je^{-j(\omega-\omega_s)T} F_Q(\omega - \omega_s),$$

and the following applies $$S_{ZF}(\omega) = S_{ZFI}(\omega) + S_{ZFQ}(\omega) = = F_I(\omega - \omega_s) + je^{-j(\omega-\omega_s)T} F_Q(\omega - \omega_s). \quad (8)$$

The result shows that the IF spectrum arises by way of simple shifting of the spectrum at the pulse shaped output (and potential phase rotation) and that the interpolation filter causes no distortions, even though it has a cosine-shaped frequency response. This is to be attributed to a type of vestigial sideband modulation as illustrated in FIG. 3 with reference to the spectra.

FIG. 3c additionally shows the fundamental frequency response of a time-continuous analog IF filter that equalizes the sin x/x distortions of the digital-/analog converter in its pass band and suppresses the periodic continuation of the spectrum in its stop band. The sin x/x compensation could potentially be undertaken in the digital part as well.

The derivation shown here for the modulator applies by full analogy to the demodulator, including the decimator.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method for clocked digital amplitude modulation, wherein signal sampling sequences are available from two carrier oscillations which are at 90° phase positions relative to one another and at a predetermined sampling frequency, comprising the steps of:

producing the carrier oscillations at one-fourth of the predetermined sampling frequency;

setting the phase positions relative to the sampling times such that every second sample of both carrier oscillations is alternately zero so that respectively one of the two carrier oscillations is zero at every clock time;

reversing the operational sign of every second sample to provide two sampling sequences at half the sampling frequency; and interleaving the two sampling sequences to provide quadrature amplitude modulation offset by one sampling.

* * * * *